United States Patent
Zweifel

(10) Patent No.: US 8,508,387 B2
(45) Date of Patent: Aug. 13, 2013

(54) SYSTEMS AND METHODS FOR AIRCRAFT WINDSHEAR DETECTION

(75) Inventor: Terry L. Zweifel, Phoenix, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 1154 days.

(21) Appl. No.: 12/127,427

(22) Filed: May 27, 2008

(65) Prior Publication Data

US 2009/0002196 A1 Jan. 1, 2009

Related U.S. Application Data

(60) Provisional application No. 60/931,892, filed on May 24, 2007.

(51) Int. Cl.
G08B 23/00 (2006.01)
G01C 23/00 (2006.01)

(52) U.S. Cl.
USPC ............... 340/968; 340/949; 340/963; 701/3

(58) Field of Classification Search
USPC ............. 340/968, 949, 969, 963; 73/170.01, 73/170.02, 170.11, 170.12, 170.14, 189, 73/204.14, 204.21, 861.65, 861.85; 701/7, 701/14, 3; 702/3
See application file for complete search history.

(56) References Cited

U.S. PATENT DOCUMENTS

| | | | |
|---|---|---|---|
| 3,892,374 A | 7/1975 | Lambregts | |
| 4,012,713 A | 3/1977 | Greene et al. | |
| 4,060,793 A | 11/1977 | Bateman | |
| 4,079,905 A | 3/1978 | Greene | |
| 4,189,118 A | 2/1980 | Peter-Contesse | |
| 4,189,119 A | 2/1980 | Peter-Contesse et al. | |
| 4,209,152 A | 6/1980 | Stephan | |
| 4,212,444 A | 7/1980 | Stephan | |
| 4,240,250 A | 12/1980 | Harris | |
| 4,245,805 A | 1/1981 | Stephan | |
| 4,319,219 A | 3/1982 | Rein-Weston | |
| 4,326,253 A | 4/1982 | Cooper et al. | |
| 4,347,572 A | 8/1982 | Berwick, Jr. et al. | |
| 4,373,184 A | 2/1983 | Lambregts | |
| 4,390,950 A | 6/1983 | Muller | |
| 4,422,147 A | 12/1983 | Hanke | |
| 4,485,446 A | 11/1984 | Sassi | |
| 4,536,843 A | 8/1985 | Lambregts | |
| 4,609,987 A | 9/1986 | Greene | |
| 4,646,243 A | 2/1987 | Graupp et al. | |
| 4,725,811 A | 2/1988 | Muller et al. | |
| 4,728,951 A | 3/1988 | Johnson et al. | |
| 4,763,266 A | 8/1988 | Schultz et al. | |
| 4,784,353 A | 11/1988 | Sigalla | |
| 4,786,905 A | 11/1988 | Muller | |
| 4,801,110 A | 1/1989 | Skutecki | |
| 4,849,900 A | 7/1989 | Blight et al. | |
| 4,853,861 A | 8/1989 | Ford et al. | |
| 4,855,738 A | 8/1989 | Greene | |
| 4,857,922 A | 8/1989 | Miller et al. | |
| 4,863,120 A | 9/1989 | Zweifel et al. | |

(Continued)

*Primary Examiner* — Anh V La
(74) *Attorney, Agent, or Firm* — Allen J. Moss; Squire Sanders (US) LLP

(57) ABSTRACT

The present invention allows quick detection of actual hazardous windshears while ignoring the effects of normal turbulence. A system according to one aspect of the present invention comprises a signal processor configured to determine a presence of hazardous windshear based on: (a) whether a measured windshear is beyond a first predetermined threshold, and (b) whether a measured turbulence level is beyond a second predetermined threshold.

37 Claims, 6 Drawing Sheets

(56) References Cited

U.S. PATENT DOCUMENTS

| | | |
|---|---|---|
| 4,875,770 A | 10/1989 | Rogers et al. |
| 4,891,642 A | 1/1990 | Muller |
| 4,893,245 A | 1/1990 | Zweifel |
| 4,905,000 A | 2/1990 | Bateman |
| 4,908,619 A | 3/1990 | Bala et al. |
| 4,910,513 A | 3/1990 | Kelly et al. |
| 4,937,447 A | 6/1990 | Barrett |
| 4,937,571 A | 6/1990 | Bonafe |
| 4,947,164 A | 8/1990 | Bateman |
| 4,956,780 A | 9/1990 | Sankrithi et al. |
| 4,967,363 A | 10/1990 | Bonafe |
| 5,003,305 A | 3/1991 | Kelly et al. |
| 5,036,331 A | 7/1991 | Dallabetta et al. |
| 5,036,469 A | 7/1991 | Pelton |
| 5,036,480 A | 7/1991 | Zweifel et al. |
| 5,049,838 A | 9/1991 | Voyce |
| 5,050,086 A | 9/1991 | Lambregts |
| 5,053,767 A | 10/1991 | Zweifel et al. |
| 5,059,964 A | 10/1991 | Bateman |
| 5,060,889 A | 10/1991 | Nadkarni et al. |
| 5,077,558 A | 12/1991 | Kuntman |
| 5,079,711 A | 1/1992 | Lambregts et al. |
| 5,088,661 A | 2/1992 | Whitener |
| 5,113,346 A | 5/1992 | Orgun et al. |
| 5,119,091 A | 6/1992 | Zweifel |
| 5,136,518 A | 8/1992 | Glover |
| RE34,082 E | 9/1992 | Greene |
| 5,153,588 A | 10/1992 | Muller |
| 5,187,477 A | 2/1993 | Glover |
| 5,274,558 A | 12/1993 | High et al. |
| 5,276,326 A | 1/1994 | Philpott |
| 5,285,070 A | 2/1994 | Barrett |
| 5,325,175 A | 6/1994 | Mocker et al. |
| 5,349,347 A | 9/1994 | Muller |
| 5,359,330 A * | 10/1994 | Rubin et al. ............... 342/26 D |
| 5,359,888 A | 11/1994 | Hagen |
| 5,361,065 A | 11/1994 | Johnson et al. |
| 5,367,460 A | 11/1994 | Fabre |
| 5,379,035 A | 1/1995 | Glover |
| 5,394,238 A | 2/1995 | Mocker et al. |
| 5,485,156 A | 1/1996 | Manseur et al. |
| 5,493,293 A | 2/1996 | Hansen et al. |
| 5,523,759 A | 6/1996 | Gillberg et al. |
| 5,563,604 A | 10/1996 | Brandao et al. |
| 5,585,557 A | 12/1996 | Loschke et al. |
| 5,613,652 A | 3/1997 | Greene |
| 5,648,782 A | 7/1997 | Albo et al. |
| 5,686,908 A | 11/1997 | Glover |
| 5,689,251 A | 11/1997 | Houck et al. |
| 5,744,710 A | 4/1998 | Abatzoglou et al. |
| 5,751,830 A | 5/1998 | Hutchinson |
| 5,760,734 A | 6/1998 | Urkowitz |
| 5,781,126 A | 7/1998 | Paterson et al. |
| 5,797,562 A | 8/1998 | Wyatt |
| 5,826,834 A | 10/1998 | Potter et al. |
| 5,831,570 A | 11/1998 | Ammar et al. |
| 5,945,926 A | 8/1999 | Ammar et al. |
| 5,974,875 A | 11/1999 | Leslie et al. |
| 5,995,880 A | 11/1999 | Larramendy et al. |
| 6,000,285 A | 12/1999 | Leslie et al. |
| 6,002,347 A | 12/1999 | Daly et al. |
| 6,043,757 A | 3/2000 | Patrick |
| 6,043,759 A | 3/2000 | Paterson et al. |
| 6,044,311 A | 3/2000 | Larramendy et al. |
| 6,070,460 A | 6/2000 | Leslie et al. |
| 6,127,944 A | 10/2000 | Daly et al. |
| 6,133,846 A | 10/2000 | Birkedahl et al. |
| 6,154,169 A | 11/2000 | Kuntman |
| 6,163,756 A | 12/2000 | Baron et al. |
| 6,184,816 B1 | 2/2001 | Zheng et al. |
| 6,188,330 B1 | 2/2001 | Glover |
| 6,211,815 B1 | 4/2001 | Richey et al. |
| 6,236,351 B1 | 5/2001 | Conner et al. |
| 6,236,914 B1 | 5/2001 | Kaloust |
| 6,237,405 B1 | 5/2001 | Leslie |
| 6,246,929 B1 | 6/2001 | Kaloust |
| 6,259,379 B1 | 7/2001 | Paterson et al. |
| 6,272,433 B2 | 8/2001 | Baron et al. |
| 6,308,132 B1 | 10/2001 | Wilson et al. |
| 6,356,843 B1 | 3/2002 | Baron et al. |
| 6,369,178 B1 | 4/2002 | McCarthy |
| 6,374,364 B1 | 4/2002 | McElroy et al. |
| 6,385,513 B1 | 5/2002 | Murray et al. |
| 6,388,608 B1 | 5/2002 | Woodell et al. |
| 6,389,355 B1 | 5/2002 | Gibbs et al. |
| 6,430,480 B1 | 8/2002 | Ammar et al. |
| 6,456,226 B1 | 9/2002 | Zheng et al. |
| 6,467,003 B1 | 10/2002 | Doerenberg et al. |
| 6,493,609 B2 | 12/2002 | Johnson |
| 6,507,307 B1 | 1/2003 | Huber, Jr. |
| 6,512,476 B1 | 1/2003 | Woodell |
| 6,525,674 B1 | 2/2003 | Kelly et al. |
| 6,531,967 B2 * | 3/2003 | Djorup ..................... 340/949 |
| 6,563,452 B1 | 5/2003 | Zheng et al. |
| 6,583,733 B2 | 6/2003 | Ishihara et al. |
| 6,591,171 B1 | 7/2003 | Ammar et al. |
| 6,597,305 B2 | 7/2003 | Szeto et al. |
| 6,644,849 B1 | 11/2003 | Conner |
| 6,650,269 B1 | 11/2003 | Huber, Jr. |
| 6,662,086 B2 | 12/2003 | Lemelson et al. |
| 6,667,710 B2 | 12/2003 | Cornell et al. |
| 6,683,541 B2 | 1/2004 | Staggs et al. |
| 6,690,317 B2 | 2/2004 | Szeto et al. |
| 6,693,559 B1 | 2/2004 | Gyde et al. |
| 6,700,482 B2 | 3/2004 | Ververs et al. |
| 6,703,945 B2 | 3/2004 | Kuntman et al. |
| 6,720,906 B2 | 4/2004 | Szeto et al. |
| 6,737,987 B2 | 5/2004 | Conner et al. |
| 6,738,010 B2 | 5/2004 | Steele et al. |
| 6,741,208 B1 | 5/2004 | West et al. |
| 6,759,131 B2 | 7/2004 | McCarthy |
| 6,828,922 B1 | 12/2004 | Gremmert et al. |
| 6,828,923 B2 | 12/2004 | Anderson |
| 6,833,797 B2 | 12/2004 | Ishihara |
| 6,839,018 B2 | 1/2005 | Szeto et al. |
| 6,892,118 B1 | 5/2005 | Feyereisen |
| 6,906,641 B2 | 6/2005 | Ishihara |
| 6,977,608 B1 | 12/2005 | Anderson et al. |
| 7,019,686 B2 | 3/2006 | Hester et al. |
| 7,068,187 B2 | 6/2006 | Ishihara et al. |
| 7,081,834 B2 | 7/2006 | Ruokangas et al. |
| 7,088,264 B2 | 8/2006 | Riley |

* cited by examiner

SYSTEMS AND METHODS FOR AIRCRAFT WINDSHEAR DETECTION

CROSS-REFERENCE TO RELATED APPLICATIONS

This application claims priority from U.S. Provisional Application. No. 60/931,892, filed May 24, 2007 and entitled "AIRCRAFT WINDSHEAR DETECTION WITH IMPROVED PERFORMANCE AND TURBULENCE REJECTION," which is incorporated herein by reference in its entirety.

DESCRIPTION OF THE INVENTION

1. Field of the Invention

The present invention relates to systems and methods for aircraft windshear detection.

2. Background of the Invention

Low altitude encounters with a weather condition known as windshear have resulted in a number of aircraft accidents in the past. As used herein, "windshear" may refer to any sudden change in the magnitude or direction of wind. Windshear may affect the air speed of aircraft and negatively affect the performance of the aircraft as a result. Atmospheric turbulence may also be considered windshear, but generally only those changes in wind that are sustained for significant lengths of time pose a threat to aircraft. Turbulence typically has a much higher frequency than dangerous windshears and thus usually does not threaten the safe flight of an aircraft in a landing or takeoff.

In an encounter with a windshear, the aircraft may experience either an airspeed gain or loss dependent on the sign of the wind change. Similarly, it may experience a downward or upward wind sufficient to perturb the aircraft's flight path appreciably. The most dangerous of the windshear conditions are those resulting in airspeed loss or downward wind that tends to push the aircraft toward the ground. In the former case, loss of airspeed may result in a stall condition wherein the aircraft has lost lift. If the pilot attempts to prevent the loss of speed, he/she will have to decrease the pitch attitude of the aircraft, thereby causing the aircraft to descend toward the ground. In the latter case, the downward motion of the airmass can cause the aircraft to descend toward the ground and the pilot's attempts to arrest the descent by increasing the attitude of the aircraft can result in a stalled condition. Consequently, it is desirable to notify the pilot as quickly as possible of impending windshears so as to enable him/her to take corrective action as soon as possible.

A number of attempts and proposals have been made in the past to provide the pilot of an aircraft during a takeoff phase of landing approach with a warning of impending windshear conditions. Many of these have involved detecting changes in ground speed (e.g., by using a ground based reference such as distance measuring equipment (DME) or by using an airspeed transducer and measuring the rate of change of its output), augmented by longitudinal acceleration to provide an inertial component related to the earth. Still other proposals have added vertical accelerometers to provide measures of aircraft vertical motion produced by the effects of windshear or utilized an input in accordance with the downdrift angle of the aircraft from the desired flight path. Some windshear detection systems typically used a fixed, predetermined threshold of the rate of change of the wind with respect to time. More sophisticated systems, such as the system described in U.S. Pat. No. 4,728,951, entitled "Vertical Windshear Detection for Aircraft", utilized a variable threshold dependent on the magnitude of the measured wind rate.

Conventional systems and methods for detecting windshear may suffer due to the susceptibility of the systems to normal atmospheric turbulence which does not threaten the aircraft. Several attempts to minimize these false or nuisance alerts used the aircraft's speed compared to a reference landing speed, as for example, in U.S. Pat. No. 5,119,091 wherein the windshear detection thresholds were modified as a function of the computed landing speed and the actual aircraft speed. While these systems helped in minimizing nuisance warnings, there was no assurance that the flight crew would in fact be flying at a higher speed since other concerns of aircraft spacing during landing and stopping distance could affect the flight crew's decision for the approach/landing speed. Consequently, nuisance warnings can still occur in normal aircraft operation. The present invention addresses these and other issues.

SUMMARY OF THE INVENTION

Systems and methods of the present invention provide for the timely and reliable detection of both horizontal and vertical windshear. Standard instrumentation available on most aircraft can be used to sense and calculate the magnitude of the vertical and horizontal windshears. The present invention allows quick detection of actual hazardous windshears while ignoring the effects of normal turbulence.

A system according to one aspect of the present invention comprises a signal processor configured to determine a presence of hazardous windshear based on: (a) whether a measured windshear is beyond a first predetermined threshold, and (b) whether a measured turbulence level is beyond a second predetermined threshold.

A method according to another aspect of the present invention comprises detecting a presence of windshear based on: (a) whether a measured windshear is beyond a first predetermined threshold and (b) whether a measured turbulence level is beyond a second predetermined threshold.

A system according to another aspect of the present invention comprises a signal processor configured to: (a) receive a windshear measurement and (b) provide a processed windshear measurement based on the windshear measurement, the processed windshear measurement for detecting a presence of windshear. The signal processor may be further configured to: (c) receive a modified windshear measurement and (d) provide a processed modified windshear measurement based on the modified windshear measurement, the processed modified windshear measurement for indicating a level of turbulence.

A method according to another aspect of the present invention comprises (a) receiving a windshear measurement and (b) providing a processed windshear measurement based on the windshear measurement, the processed windshear measurement for determining a presence of windshear. The method may further include (c) receiving a modified windshear measurement and (d) providing a processed modified windshear measurement based on the modified windshear measurement, the processed modified windshear measurement for indicating a level of turbulence.

A system according to another aspect of the present invention comprises a filter configured to receive a windshear measurement and a modified windshear measurement, and provide a filtered windshear measurement based on the windshear measurement and a filtered modified windshear measurement based on the modified windshear measurement. The system further includes a windshear detection system in communication with the filter, the windshear detection system configured to provide a windshear alert based on the filtered windshear measurement and the filtered modified windshear measurement.

A method according to another aspect of the present invention comprises receiving a windshear measurement and a modified windshear measurement, filtering the windshear measurement and the modified windshear measurement, and providing a windshear alert based on the filtered windshear measurement and the filtered modified windshear measurement.

A system according to another aspect of the present invention comprises a first filter configured to (a) receive a windshear measurement and (b) provide a filtered windshear measurement based on the windshear measurement. The system further comprises a second filter configured to (a) receive a modified windshear measurement; and (b) provide a filtered modified windshear measurement based on the modified windshear measurement. The system further includes a windshear detection system in communication with the first filter and the second filter, the windshear detection system configured to provide a windshear alert based on the filtered windshear measurement and the filtered modified windshear measurement.

A method according to another aspect of the present invention comprises (a) receiving, by a first filter, a windshear measurement and (b) providing, by the first filter, a filtered windshear measurement based on the windshear measurement. The method further includes (c) receiving, by a second filter, a modified windshear measurement and (d) providing, by the second filter, a filtered modified windshear measurement based on the modified windshear measurement, and (e) providing a windshear alert based on the filtered windshear measurement and the filtered modified windshear measurement.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Windshear Calculations

Figure 1:
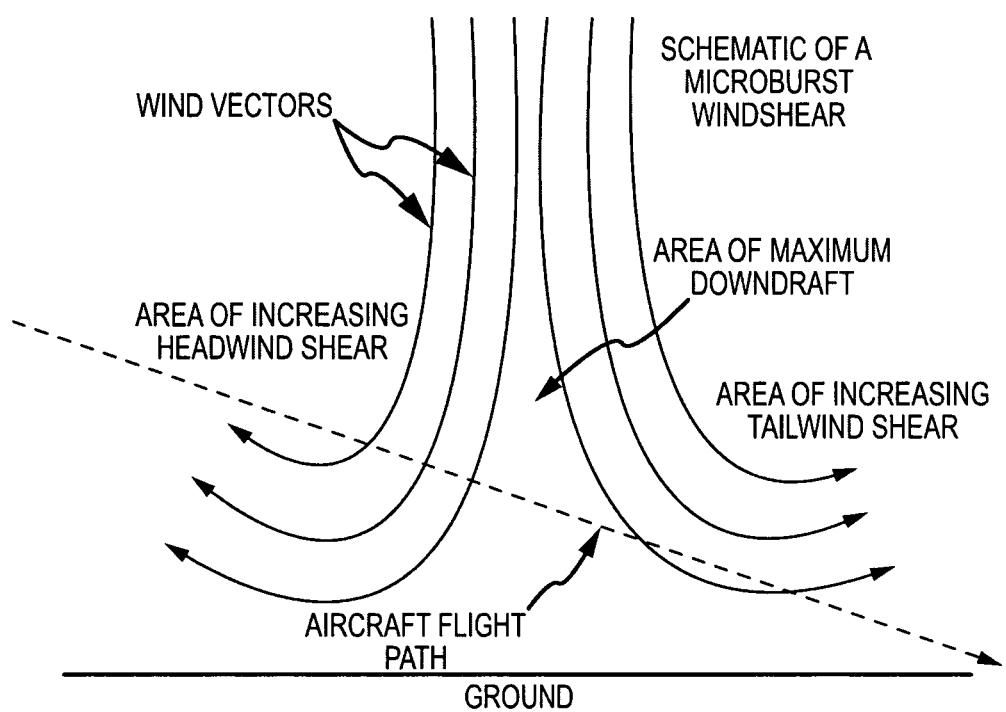
FIG. 1 is an illustration of a downburst windshear envelope relative to the flight path of an aircraft, showing the wind vectors of the most dangerous of the windshear phenomena, the microburst.

One type of windshear is termed a "microburst" and is particularly dangerous to aircraft when encountered at low altitudes during the aircraft's takeoff and approach phases of flight, when the aircraft is most susceptible to a sudden downdraft. FIG. 1 illustrates the streamline envelope of a typical microburst relative to the flight path of an aircraft. An onboard computer can be used in the detection of windshear conditions by monitoring of certain measured sensor parameters. Once a windshear condition is detected, the pilot can be alerted to this fact, so that appropriate measures can be taken to fly the aircraft to safety.

As the microburst may produce head windshears and upward vertical winds prior to tail windshears and downward vertical winds, it may be prudent to alert the pilot to all forms of encountered windshears. As will be discussed further below with reference to FIG. 3B, the present invention provides a cautionary annunciation in the event of a head windshear or upward vertical windshear and a warning annunciation in the event of a tail windshear or downward vertical windshear.

The wind vectors of a microburst shown in FIG. 1 may be resolved into horizontal and vertical components. For ease of explanation, the description of windshear detection for the present invention will be discussed in terms of these components. The calculation of horizontal and vertical windshear described below may be performed in any suitable manner, such as through software operating on a computer system, via hardware, or a combination of the two. In one exemplary embodiment of the present invention, the calculation of horizontal and vertical windshear is performed by the windshear detection system 320 depicted in FIGS. 3A and 3B.

Upon encountering a purely horizontal tail windshear, the aircraft's speed initially begins decaying at the rate of the shear itself. The calculation of the horizontal windshear can be computed using the equation well-known to those skilled in the art:

$$dV_w/dt = dV_g/dt - dV_T/dt \tag{1}$$

Where $dV_w/dt$ is the magnitude of the windshear (the time rate of change of the wind), $dV_g/dt$ is the time rate of change of the aircraft's ground speed, and $dV_T/dt$ is the time rate of change of the aircraft's true airspeed. The term $dV_g/dt$ is directly measured by an accelerometer mounted on the aircraft that measures horizontal acceleration, called by convention, $a_H$. The term $dV_T/dt$ can be derived by passing the true airspeed of the aircraft through a conventional differentiator circuit, either analog or digital in nature.

Figure 2:
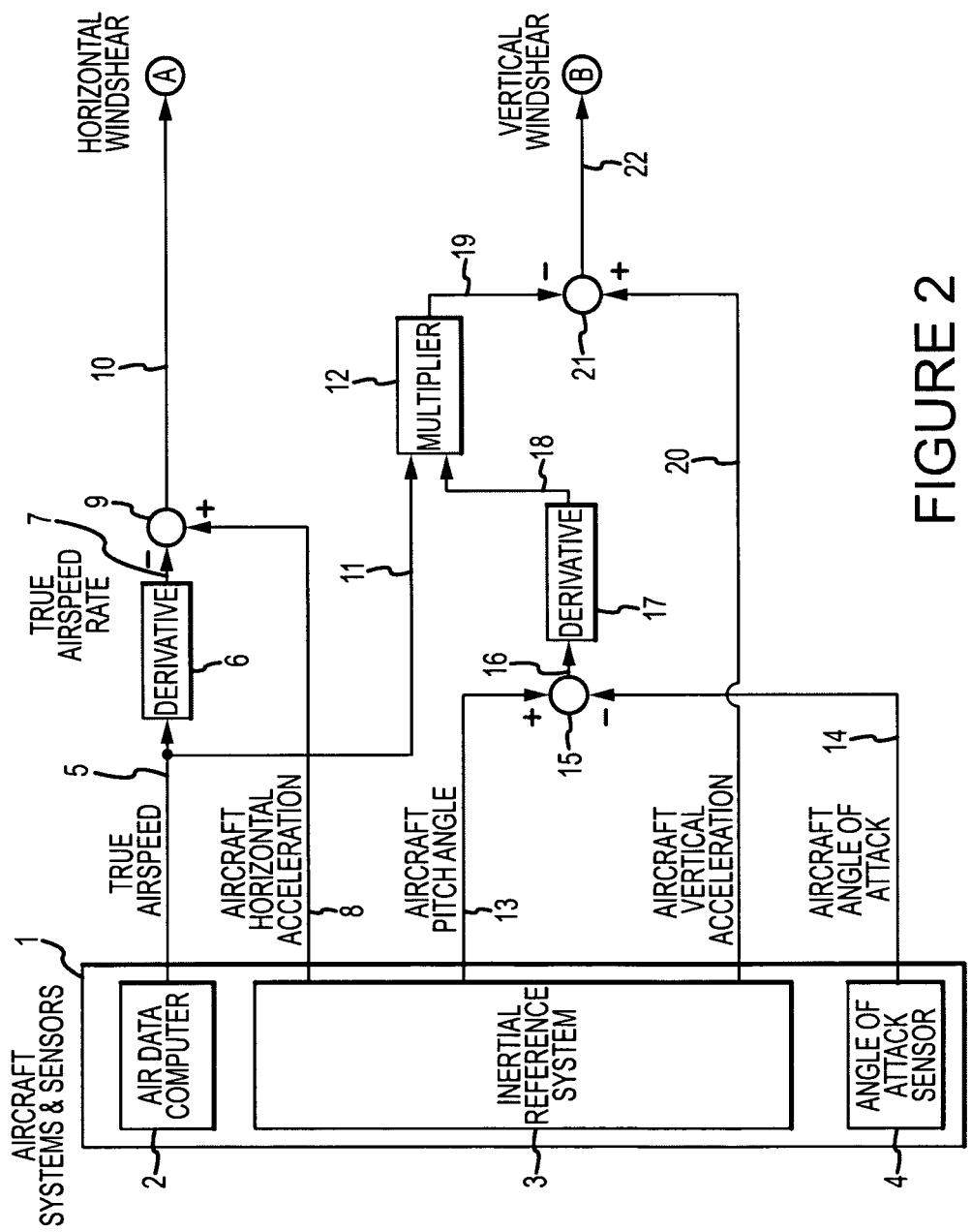
FIG. 2 is a schematic block diagram showing an exemplary computation of the horizontal and vertical windshear components derived from instrumentation aboard an aircraft.

Referring now to FIG. 2, typical aircraft systems and sensors are shown in block 1 and are used to supply signals to the present invention. These include an air data computer 2, which supplies a signal proportional to the aircraft's true airspeed appearing on lead 5, and an inertial reference system 3 that supplies a signal proportional to the aircraft's horizontal acceleration that appears on lead 8, the aircraft's pitch angle on lead 13, and the aircraft's vertical acceleration on lead 20. The aircraft systems 1 may include any other systems or devices (in any combination) that provide the desired signals for calculating windshear, such as accelerometers mounted on the aircraft and/or a vertical gyro system that measures the pitch angle of the aircraft.

The true airspeed signal that appears on lead 5 is supplied to a derivative block, 6, which supplies on lead 7 a signal proportional to the time rate of change of the true airspeed, or true airspeed rate. Lead 7 is supplied to conventional summing junction 9 which subtracts true airspeed rate from the aircraft's horizontal acceleration that appears on lead 8. The result appears on lead 10 and is a direct measure of the horizontal windshear that the aircraft is experiencing. The magnitude of the horizontal windshear is supplied at terminal A, and is referred to below with reference to FIG. 4.

The calculation of the vertical windshear can also be computed using equations well-known to those skilled in the art. The equation that relates vertical wind to ground and airmass reference frames is analogous to equation (1) above:

$$dh_g/dt = dh_a/dt + dh_w/dt \quad (2)$$

Where $dh_g/dt$ is the aircraft's altitude rate relative to the ground, $dh_a/dt$ is its altitude rate relative to the airmass, and $dh_w/dt$ is the rate of change of the vertical wind.

Solving for $dh_w/dt$ results in:

$$dh_w/dt = dh_g/dt - dh_a/dt \quad (3)$$

Taking the derivative of equation (3) with respect to time produces:

$$d^2h_w/dt^2 = d^2h_g/dt^2 - d^2h_a/dt^2 \quad (4)$$

The first term on the right side of equation (4) is the vertical acceleration of the aircraft with respect to the ground and may be obtained by an accelerometer mounted on the aircraft such that vertical acceleration is sensed. The second term on the right side of equation (4) is the aircraft's acceleration relative to the airmass. This latter term may be computed from the following well-known relationships that use small angle approximations:

$$\gamma = \theta - \alpha \quad (5)$$

Where $\gamma$ is the aircraft's flight path angle relative to the airmass, $\theta$ the aircraft's pitch angle, and $\alpha$ the aircraft's angle of attack. Furthermore:

$$\gamma = (dh_g/dt)/V_T \quad (6)$$

Equating the right sides of equations (5) and (6) produces:

$$\theta - \alpha = (dh_g/dt)/V_T \quad (7)$$

Solving for $dh_g/dt$ and taking the derivative with respect to time yields the equation:

$$d^2h_a/dt^2 = V_T(d\theta/dt - d\alpha/dt) + dV_T/dt(\theta - \alpha) \quad (8)$$

An analysis of the second term on the right side of the equation reveals that it is small compared to the first term and thus can be ignored. Hence the equation reduces to:

$$d^2h_a/dt^2 = V_T(d\theta/dt - d\alpha/dt) \quad (9)$$

Equation (4) may now be solved for the vertical wind acceleration, D2hw/dt2.

$$d^2h_w/dt^2 = d^2h_g/dt^2 - V_T(d\theta/dt - d\alpha/dt) \quad (10)$$

Referring once more to FIG. 3, a signal proportional to the aircraft's pitch angle is supplied to lead 13 from an inertial reference system 3 (or other suitable source. Simultaneously, a signal proportional to the aircraft's angle of attack appears on lead 14 from an angle of attack sensor, 4.

The signals on leads 13 and 14 are subtracted using conventional summing junction 15 and the result appears on lead 16, representing the term $\theta - \alpha$.

Lead 16 supplies derivative block 17 which supplies lead 18 with a signal representing $d(\theta-\alpha)/dt$, which is the equivalent of the term $(d\theta/dt - d\alpha/dt)$ in equation (10). Lead 18 supplies conventional multiplier 12 which multiplies the value on lead 18 by the aircraft's true airspeed which appears on lead 11. The resultant appears on lead 19 and represents the term $V_T(d\theta/dt - d\alpha/dt)$.

The aircraft's vertical acceleration is supplied by the inertial reference system 3 (or other suitable source) on lead 20. The aircraft's vertical acceleration corresponds to the term $d^2h_g/dt^2$ in equation (10) above. Conventional summing junction 21 subtracts the signal on lead 19 from that on lead 20 and the result appears on lead 22 and terminal B. This signal represents the magnitude of the vertical windshear, $d^2h_w/dt^2$, according to equation (10) above.

Exemplary System & Method

Figure 3A:
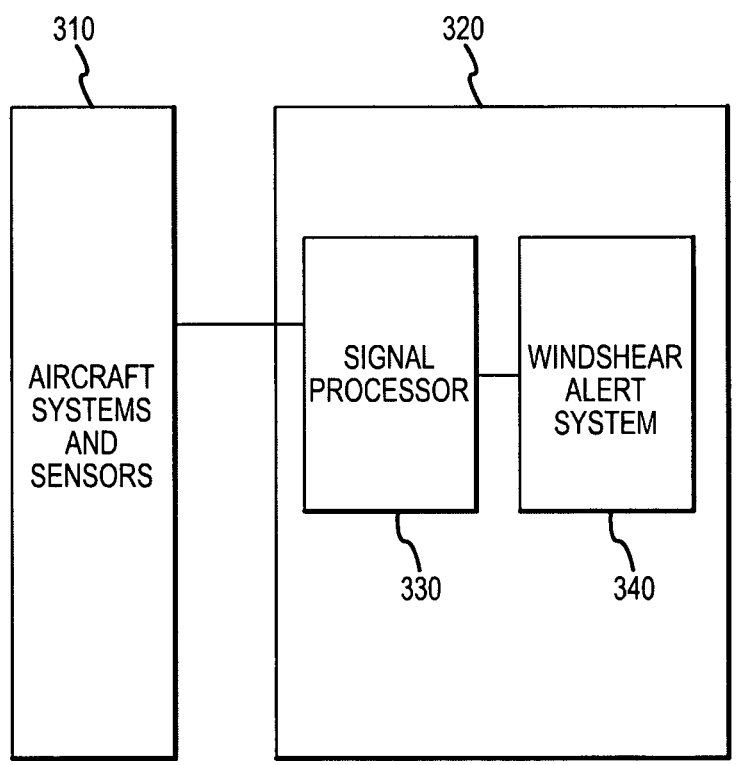
FIG. 3A is a block diagram of an exemplary system according to various aspects of the present invention.

An exemplary system according to various aspects of the present invention is depicted in FIG. 3A. This system comprises a windshear detection system 320 that includes a signal processor 330 and a windshear alert system 340. Aircraft systems and sensors 310 in communication (directly or indirectly) with the signal processor 230 provide wind speed data used to calculate to horizontal and vertical windshear measurements as described above. Any of the components depicted in FIG. 3A can be implemented as separate systems or integrated with each other (or other suitable components) in any combination and in any suitable manner. For example, the windshear detection system 220 may include a processor (not shown) configured to execute instructions stored in a memory (also not shown) to perform windshear calculations, process data, and/or control the functionality of the signal processor 230 and/or windshear alert system 240. The system in FIG. 3A may operate in conjunction with any other suitable embodiments of systems and methods of the present invention.

As described previously, the aircraft systems and sensors 310 supply signals used to calculate horizontal and/or vertical windshear. The aircraft systems and sensors may include any desired systems and devices, such as an air data computer, inertial reference system, angle of attack sensor. The aircraft systems and sensors 310 may measure and provide data on any desired flight characteristic for an aircraft, such as the aircraft's airspeed, horizontal acceleration, pitch angle, vertical acceleration, and angle of attack.

The windshear detection system 320 receives data from the aircraft systems and sensors 310, determines whether windshear is present, and issues an appropriate caution or warning. The functionality of the windshear detection system 320 can be implemented in any suitable manner, such as through processor (not shown) executing software instructions stored in memory (not shown). Functionality may also be implemented through various hardware components storing machine-readable instructions, such as application-specific integrated circuits (ASICs), field-programmable gate arrays (FPGAs) and/or complex programmable logic devices (CPLDs). A windshear detection system 320 according to aspects of the present invention may operate in conjunction with any desired combination of software and/or hardware components.

In one exemplary embodiment of the present invention, a processor retrieves and executes instructions stored in a memory to control the operation of the windshear detection system 320. Any number and type of processor(s) such as an integrated circuit microprocessor, microcontroller, and/or digital signal processor (DSP), can be used in conjunction with the present invention. The memory stores instructions, data from aircraft systems and sensors 310, and any other suitable information. A memory operating in conjunction with the present invention may include any combination of different memory storage devices, such as hard drives, random access memory (RAM), read only memory (ROM), FLASH memory, or any other type of volatile and/or nonvolatile memory.

Figure 3B:
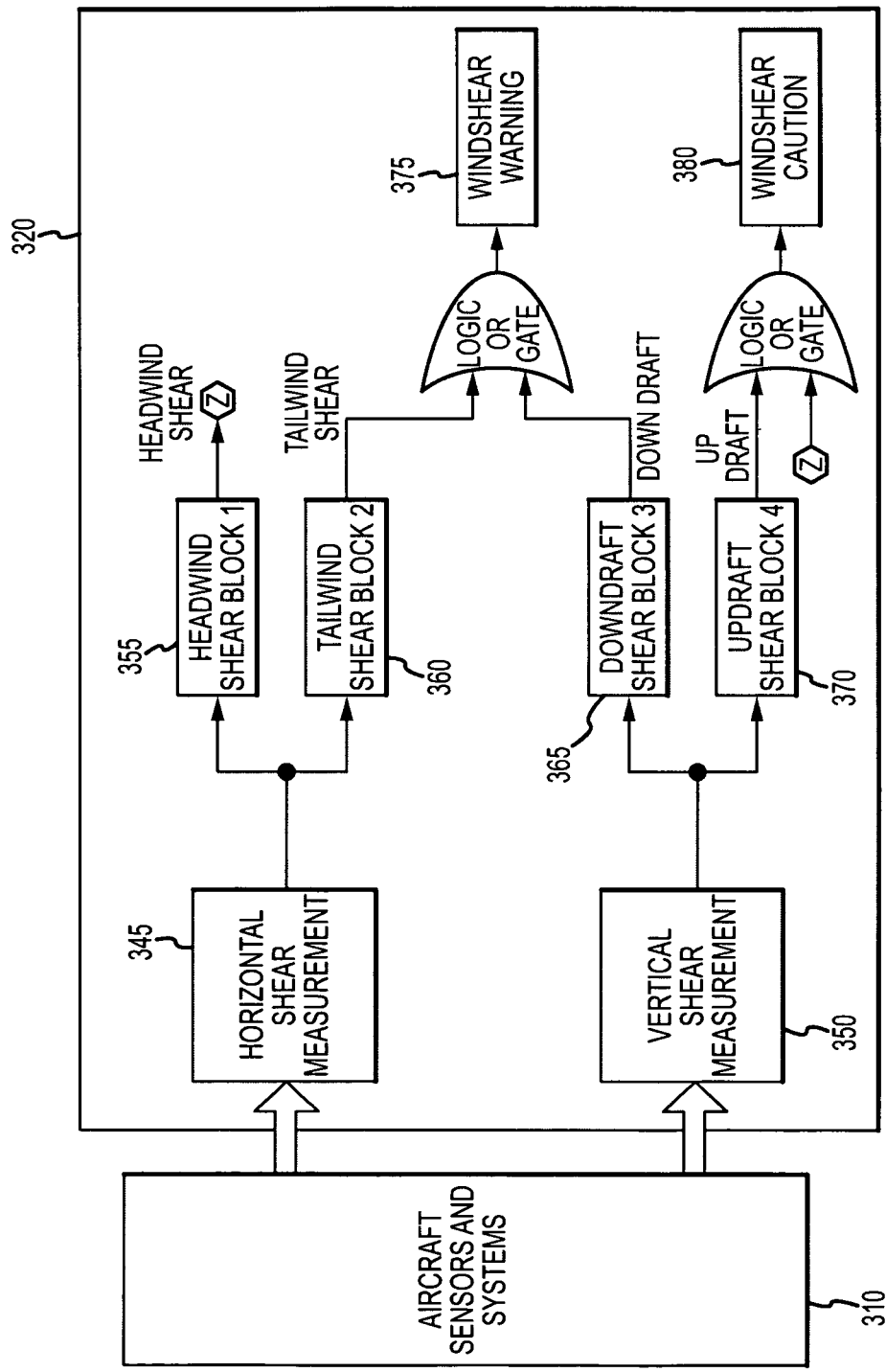
FIG. 3B is a block diagram depicting exemplary functional aspects of a portion of the system depicted in FIG. 3A. In this example, the system can use horizontal and vertical shear measurements to generate both cautionary and warning alerts to the pilot in accordance with various aspects of the present invention.

In one exemplary embodiment of the present invention, referring to FIG. 3B, the windshear detection system 320 receives data from the aircraft systems and sensors 310 and calculates a horizontal shear measurement (345) and a vertical shear measurement (350). The calculation of horizontal and vertical shear may be made in accordance with the equations described previously. The horizontal shear measurement may be used to calculate a headwind shear measurement (355) and a tailwind shear measurement (360), while the vertical shear measurement can be used to calculate a downdraft shear measurement (365) and an updraft shear measurement (370). In this exemplary embodiment, the windshear detection system 320 provides a windshear warning (375) when tailwind shear or downdraft shear is present, and a windshear caution (380) when an updraft shear or headwind shear is present. The functionality described in FIG. 3B may be implemented using the signal processor 330 and/or windshear alert system 340 in any desired combination.

The signal processor 330 processes signals and data from the aircraft systems and sensors 310. Referring to FIG. 3B, for example, the signal processor 330 may determine headwind shear (355), tailwind shear (360), downdraft shear (365), and/or updraft shear (370). The signal processor 330 may include any type of components, systems, and devices, such as one or more digital signal processors and/or one or more analog signal processors. The signal processor 330 may process signals and data from the aircraft systems and sensors 310 in any manner. In one exemplary embodiment of the present invention, the signal processor 330 filters a windshear measurement, the windshear measurement calculated based on data provided by the aircraft systems and sensors 310. The signal processor 330 may include any number and type of filters, such as one or more digital filters, one or more passive analog filters, and/or one or more active analog filters. Furthermore, filters used in conjunction with the present invention may be of any order, including second-order filters described in more detail below. Just as the parameters of the second order filters can be selected as described below, suitable parameters for filters having different orders can selected to allow such filters to operate in accordance with the present invention. For example, for a third order filter (such as a Butterworth filter), the requisite parameters for the Laplacian operators would need to be defined.

Figure 4:
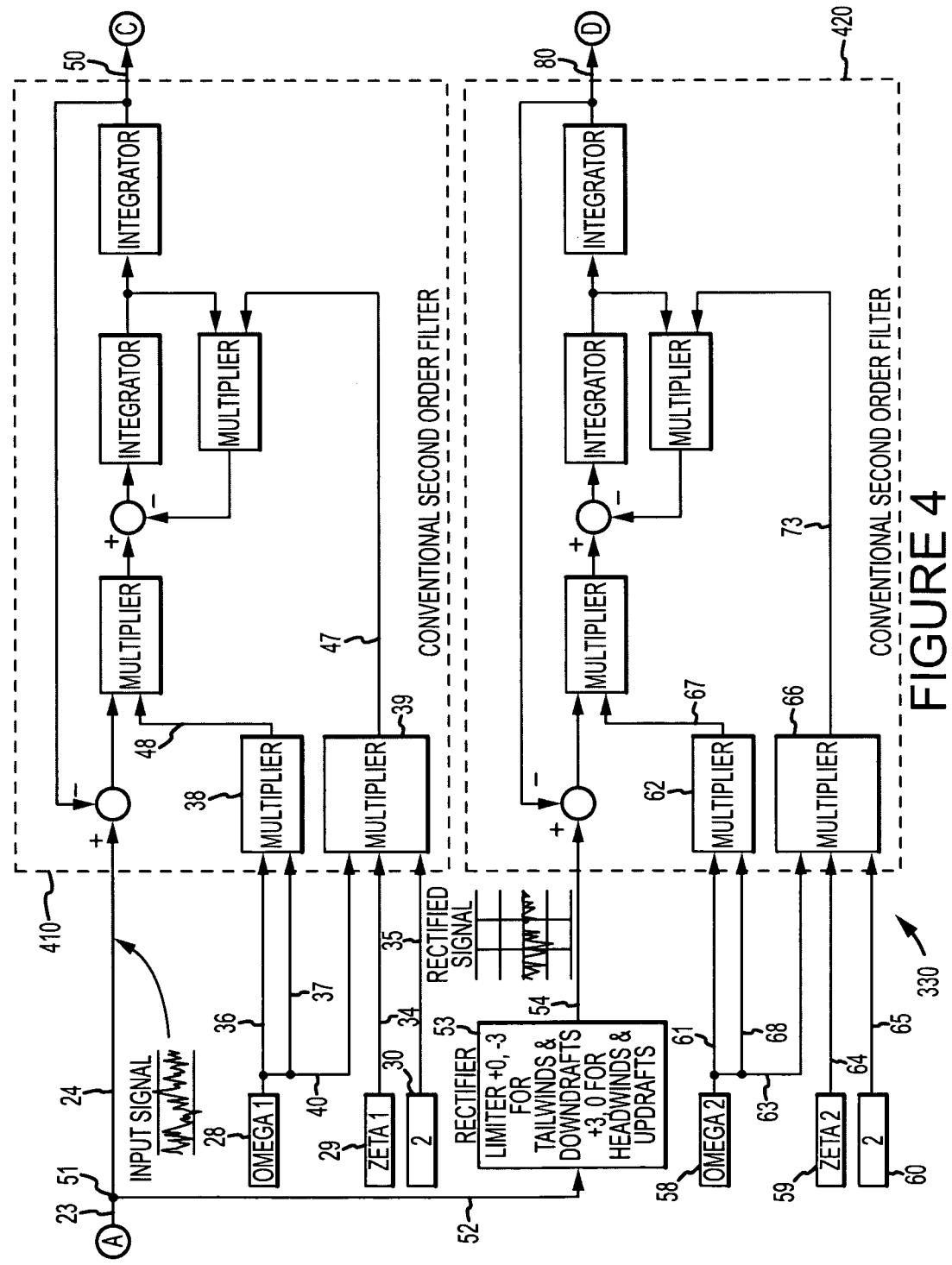
FIG. 4 is a block diagram illustrating various functional aspects of an exemplary signal processor operating in accordance with the present invention.

In one exemplary embodiment of the present invention, referring to FIG. 4, the signal processor 330 comprises two second-order filters 410, 420. Exemplary implementations of conventional second-order filters are shown within the dashed lines on FIG. 4. Filters 410 and 420 may alternatively be of any type and configuration, and may include any desired components. Filters 410 and 420 need not necessarily be of the same type or configuration. The present invention may operate in conjunction with filters having any desired order, including second-order filters or any other higher-order filter. The following discussion of the signal processor 330 depicted in FIG. 4 corresponds to functional block 360 in FIG. 3B for determining the presence of tailwind shear. The detection of headwind shear (355), downdraft shear (365) and updraft shear (370) are determined in similar fashion to the detection of tailwind shear and their calculation is not repeated for sake of brevity.

In previous windshear detection systems, turbulence rejection was accomplished by using first-order lag filters cascaded to achieve sufficient attenuation of the higher frequencies common to turbulence. Unfortunately, the time constants of these filters were necessarily the result of a compromise since the larger the time constant, the better the turbulence rejection, but at the cost of slower detection of actual dangerous shears and vice-versa. An example of this type of system is described in U.S. Pat. No. 5,053,767.

The exemplary embodiment of the present invention depicted in FIG. 4 eliminates this shortcoming by using a second-order filter which provides rapid detection of shears by proper selections of a damping ratio, known by those skilled in the art as zeta, and a natural frequency known as omega. The present invention also uses a modified value of the measured windshear to determine if significant turbulence is present. In this case, the modified windshear signal is the half-wave rectification of the measured windshear signal. Turbulence is characterized by rapid changes in the wind speed, with the average value of the time rate of change of the wind being zero. By examining the filtered value of only one polarity of the turbulence, e.g., only the negative wind rates, the present invention can determine if the aircraft is flying in turbulence with a zero mean value and make any necessary adjustments to the windshear detection levels to preclude false or nuisance windshear alerts. Conversely, if a dangerous windshear is present even in the case of turbulence, the filtered value of the rectified signal will go to zero and the shear will be quickly detected. Accordingly, the present invention can quickly detect the presence of windshear where the measured windshear exceeds a predetermined threshold at the same time the filtered, rectified windshear signal has no negative wind rate component and goes to zero.

Referring now to FIG. 4, the computed value of windshear appears on lead 23 from terminal A which was described above. As noted previously, the signal processor 330 in FIG. 4 may also be used to detect headwind shear (355) using the horizontal windshear measurement A, or to detect downdraft shear (365) and/or updraft shear (370) using the vertical windshear measurement B from FIG. 2. In calculating tailwind shear, the output of junction 51 supplies the input to a conventional second-order filter used to filter the raw data supplied by terminal A. The characteristics of this filter can be set using the values of Omega 1 (labeled 28), and Zeta 1 (labeled 29). Typical values for the present invention could be, for example, 1 radian per second and 0.4 respectively, it being understood that other values could also be used, whether constants or computed by an algorithm.

The exemplary second-order filters 410, 420 each have a transfer function described by the Laplacian equation:

$$\frac{Output}{Input} = \frac{\omega^2}{s^2 + 2\zeta\omega s + \omega^2}$$

Where $\omega$ is the natural frequency in radians per second, $\zeta$ is the damping ratio which is dimensionless, and "s" is the Laplacian operator.

A predefined value for $\omega$ is shown as a constant in box 28 labeled Omega 1. This value appears on leads 36 and 37 which supply conventional multiplier 38. The resultant value of omega squared appears on lead 48 for use by the second-order filter 410.

A predefined value for $\zeta$ is shown as a constant in box 29 labeled Zeta 1. The value appears on lead 34 and is provided to conventional multiplier 39. The signals on leads 34, 35 and 40 are multiplied together to form the product appearing on lead 27, the term 2*zeta*omega. Lead 47 is subsequently used by the conventional second-order filter 410. The output appearing on lead 50 and terminal C is the filtered value of the input (the windshear measurement) appearing on lead 24. An example of a typical input turbulence wave form is labeled "INPUT SIGNAL."

In conjunction with the filtering of the measured windshear signal described above, the signal from terminal A (the computed shear) is supplied on lead 52 which supplies limiter 53 for monitoring the turbulence level. Limiter 53 acts as a rectifier, passing only the negative half of the input wave form for detecting tailwind shears (360) and downdrafts (365), and only the positive half of the wave form for detecting headwind shears (355) and updrafts (370). Normal average turbulence is substantially 0 (i.e., the input wave is high as often as it is low). When detecting tailwind shears (360) and downdrafts (365) in accordance with the present invention, a sudden windshear spike results in no negative component of the wave form, thus the half-wave rectification of the wave goes to zero. Likewise, for detecting headwind shears (355) and updrafts (370), a windshear spike removes the positive component of the wave form, and the half-wave rectification of the wave goes to zero. The present invention can thus quickly detect the presence of hazardous windshear by monitoring when a windshear spike is beyond a predetermined threshold at the same time the half-wave rectification of the windshear measurement is beyond a second predetermined threshold (i.e., to zero).

The rectified wave appears on lead 54 where an example of a rectified wave is labeled "RECTIFIED SIGNAL." Lead 54 supplies the input to second-order filter 420, which (in this example) works identically with the second-order filter previously described. However, the natural frequency (Omega 2) and damping ratio (Zeta 2) may differ in value from Omega 1 and Zeta 1 used by filter 410.

In a similar manner as described above, box 58 supplies a value for Omega 2 which is subsequently squared using leads 61 and 61A, and conventional multiplier 62. The squared value of Omega 2 appears on lead 67.

Similarly, conventional multiplier 66 receives signals representative of Omega 2, Zeta 2, and the constant 2 on leads 63, 64, and 65 respectively. The result of the multiplication appears on lead 73. The output of the second-order filter 420 appears on lead 80 and terminal D.

While in the above description, the values of omega and zeta have been represented as constants for convenience of explanation, it is to be understood that these values could be the result of computations by, for example, software operating on a computer system (not shown) to dynamically alter the characteristics of one or both of the described second-order filters 410, 420.

The Federal Aviation Administration (FAA) in its Technical Standard Order C-117a defines the amount of speed loss (or gain) that is acceptable before a Windshear Alert must be given to the flight crew. The maximum value of this speed loss (or gain) is defined as 20 knots. This requirement can be written in equation form as:

Maximum Allowable Speed Loss=Shear Intensity*Elapsed time

For example, a windshear with an intensity of 2 knots/sec would have to be detected in 10 seconds or less. Similarly, a windshear with an intensity of 4 knots/second would have to be detected in 5 seconds or less to meet the FAA requirements.

The present invention incorporates this criterion in determining whether an alert should be displayed to the flight crew. A minimum timing threshold is established, as for example, 1 knot per second. If a measured shear exceeds this threshold, a timer is started which measures the elapsed time above the threshold. The elapsed time is multiplied by the shear magnitude to determine the speed loss (or gain) and this value is compared to an allowable speed loss (or gain), which in the present invention is set to 15 knots, but could be adjusted to other values. If the shear value times the elapsed time exceeds the allowable speed, a windshear alert is generated to the flight crew.

Figure 5:
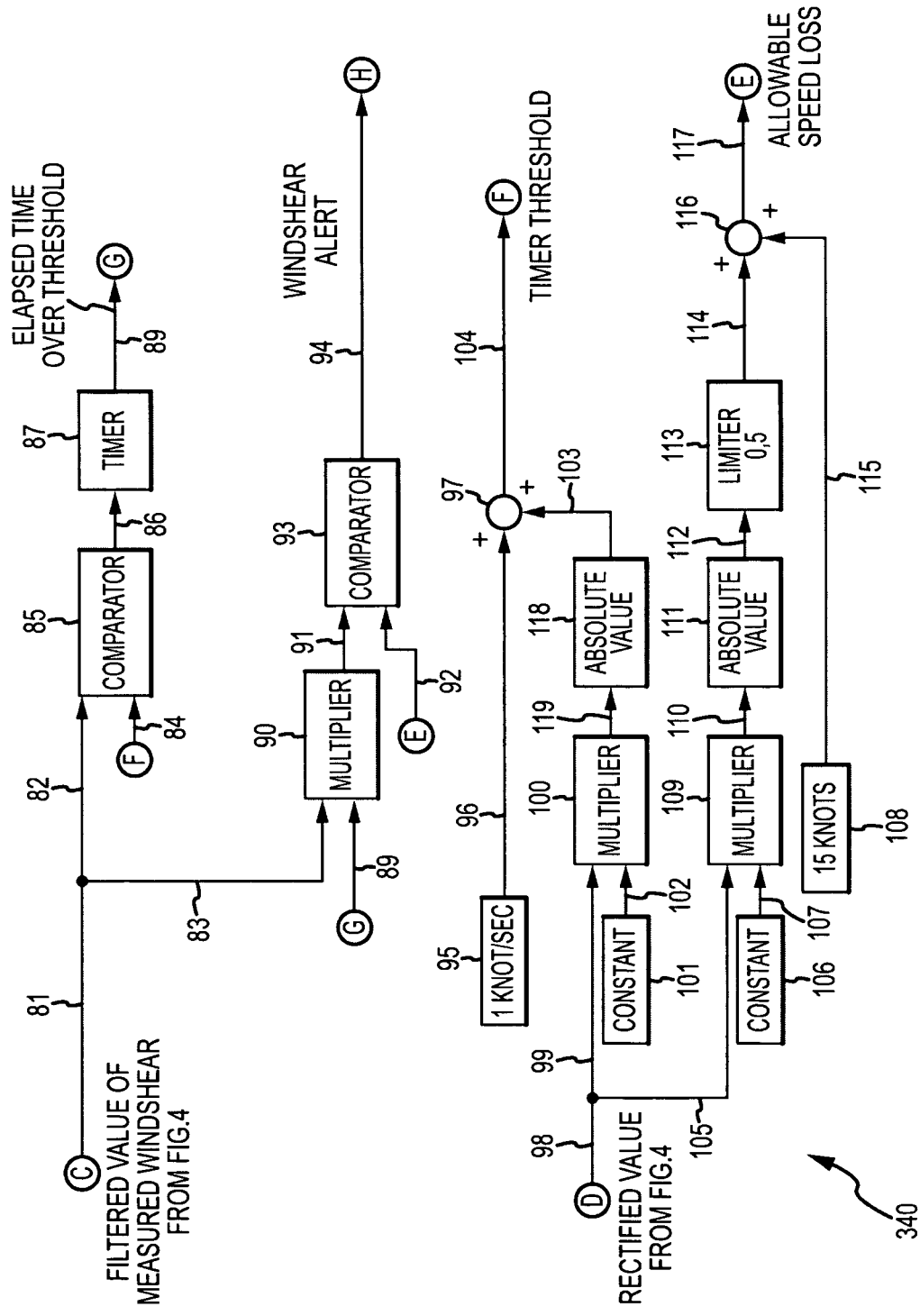
FIG. 5 is a block diagram illustrating various functional aspects of an exemplary windshear alert system according to various aspects of the present invention.

FIG. 5 depicts an exemplary windshear alert system 340. In this exemplary embodiment, the windshear alert system 340 utilizes the signals from FIG. 4 to alter both the timing threshold and allowed speed loss before annunciation and provide an appropriate windshear alert. The rectified and filtered shear signal from terminal D on FIG. 4 is provided on leads 98 and 99, which supply conventional multiplier 100. Multiplier 100 produces the product of the rectified and filtered shear signal and a constant, as for example, 0.3. This product is supplied to conventional absolute value taker 118 and then to conventional summation junction 97 where it is added to the nominal value of 1 knot/sec as shown in box 95 and on lead 96. By this action, the timing level is increased dependent on the value of the rectified and filtered shear. This signal appears on lead 104 and at terminal F.

Concurrent with the calculation of the signal on terminal F, the rectified and filtered shear also appears on lead 105 where it is multiplied times a constant, as for example 5.0, supplied from box 106 on lead 107 by conventional multiplier 109. The resultant product appears on lead 110 and is provided to conventional absolute value taker 111. The signal on lead 112 is supplied to conventional limiter 113 which restricts the value of the signal between 0 and 5. The limited value, appearing on lead 114 is then supplied to conventional summation junction 116. Summation junction 116 produces the sum of the signal on lead 114 and the nominal allowable speed loss, 15 knots, shown in box 108 and lead 109. The signal on lead 117 and terminal E represents the modified allowable speed loss dependent on the magnitude of the rectified and filtered shear.

The filtered, but unrectified, signal of the computed windshear magnitude appears at terminal C from FIG. 4 and on lead 81. Lead 81 supplies lead 82 which is then applied to comparator 85 where it is compared to the signal on lead 84, the previously computed value of the modified timing level. If the signal on lead 82 exceeds the value on lead 84, the timer 87 is started via a logical one on lead 86. The output of timer 87 is representative of the time the windshear signal has been above the computed timing level and is referred to on FIG. 5 as "elapsed time over threshold" and appears at terminal G.

The elapsed time over threshold, on lead 89, is multiplied by the value of the signal appearing on lead 83 (the filtered, unrectified, windshear signal), by conventional multiplier 90. The product of the two signals appears on lead 91 and is provided to conventional comparator 93. The previously computed value of the modified allowable speed loss is supplied from terminal E via lead 92. If the value of the signal on lead 91 exceeds the value of the signal on lead 92, a logical one appears on lead 94 and terminal H, indicating a windshear alert condition.

While two separate filters (410, 420) are depicted in FIG. 4, those of skill in the art will appreciate that it may be possible to utilize a single integrated filter configured to filter both the windshear measurement and the modified windshear measurement.

The windshear alert system 340 provides an alert based on the detection of headwind shear (355), tailwind shear (360), downdraft shear (365), and/or updraft shear (370). The generated Windshear Alerts can be provided to external equipment (such as one or more displays, speakers, lights, or other devices) to produce appropriate flashing and/or steady alert lights and aural warnings as prescribed in FAA Technical Standard Order C-117a. In the exemplary embodiment depicted FIG. 3B, a windshear warning is provided when at least one of the tailwind shear and the downdraft is present, a windshear caution is provided when at least one of the headwind shear and updraft is present.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A system comprising:
   a signal processor configured to determine a presence of hazardous windshear based on:
   (a) whether a measured windshear is beyond a first predetermined threshold; and
   (b) whether a measured turbulence level is beyond a second predetermined threshold.

2. The system of claim 1, wherein the signal processor is further configured to detect the presence of hazardous windshear based further on a maximum allowable speed loss and an elapsed time the measured windshear is beyond the first predetermined threshold.

3. The system of claim 1, wherein the signal processor comprises at least one of a digital signal processor and an analog signal processor.

4. The system of claim 1, wherein the signal processor comprises a filter.

5. The system of claim 4, wherein the filter comprises an order greater than one.

6. The system of claim 5, wherein the signal processor comprises a second order filter.

7. The system of claim 4, wherein the filter comprises at least one of a digital filter, a passive analog filter, and an active analog filter.

8. The system of claim 1, wherein the measured turbulence level comprises an average turbulence level based on the measured windshear.

9. The system of claim 8, wherein the average turbulence level is based on a half-wave rectification of the measured windshear.

10. The system of claim 1, further comprising one or more aircraft systems for providing the windshear measurement.

11. The system of claim 10, wherein the one or more aircraft systems comprise at least one of: an air data computer, a sensor, and an inertial reference system.

12. The system of claim 1, further comprising a windshear alert system for providing an alert when the presence of windshear is determined.

13. A method comprising:
   detecting, using a processor, a presence of windshear based on:
   (a) whether a measured windshear is beyond a first predetermined threshold; and
   (b) whether a measured turbulence level is beyond a second predetermined threshold.

14. The method of claim 13, wherein detecting the presence of windshear is based further on a maximum allowable speed loss and an elapsed time the measured windshear is beyond the first predetermined threshold.

15. The method of claim 13, wherein the measured turbulence level comprises an average turbulence level based on the measured windshear.

16. The method of claim 15, wherein the average turbulence level is based on a half-wave rectification of the measured windshear.

17. The method of claim 13, further comprising providing an alert when the presence of windshear is determined.

18. A system comprising:
   (1) a first filter configured to:
      (a) receive a windshear measurement; and
      (b) provide a filtered windshear measurement based on the windshear measurement;
   (2) a second filter configured to:
      (a) receive a modified windshear measurement; and
      (b) provide a filtered modified windshear measurement based on the modified windshear measurement; and
   (3) a windshear detection system in communication with the first filter and the second filter, the windshear detection system configured to provide a windshear alert based on the filtered windshear measurement and the filtered modified windshear measurement,
   wherein the windshear measurement corresponds to a horizontal shear measurement and a vertical shear measurement, wherein the filtered windshear measurement corresponds to a filtered horizontal shear measurement and a filtered vertical shear measurement, and wherein the windshear detection system is configured to:
   (a) detect, based on the filtered horizontal shear measurement and the filtered modified horizontal shear measurement, a presence of at least one of a headwind shear and a tailwind shear; and
   (b) detect, based on the filtered vertical shear measurement and the filtered modified vertical shear measurement, a presence of at least one of an updraft shear and a downdraft shear.

19. The system of claim 18, wherein:
   the first filter is configured to provide the filtered windshear measurement based further on a first natural frequency and a first damping ratio; and
   the second filter is configured to provide the filtered modified windshear measurement based further on a second natural frequency and a second damping ratio.

20. The system of claim 18, further comprising one or more aircraft systems for providing the windshear measurement.

21. The system of claim 20, wherein the one or more aircraft systems comprise at least one of: an air data computer, a sensor, and an inertial reference system.

22. The system of claim 18, further comprising a rectifier in communication with the second filter for providing the modified windshear measurement.

23. The system of claim 22, wherein the rectifier comprises a half-wave rectifier.

24. The system of claim 18, wherein the alert provided by the windshear detection system comprises a windshear warning when at least one of the tailwind shear and the downdraft is present and wherein the alert provided by the windshear detection system comprises a windshear caution when at least one of the headwind shear and updraft is present.

25. The system of claim 18, wherein at least one of the first filter and the second filter comprises an order greater than one.

26. The system of claim 25, wherein at least one of the first filter and the second filter comprises a second order filter.

27. The system of claim 18, wherein at least one of the first filter and the second filter comprises at least one of a digital filter, a passive analog filter, and an active analog filter.

28. The system of claim 18, wherein the windshear alert is further based upon the windshear measurement, a maximum allowable speed loss, and an elapsed time the windshear measurement exceeds a predetermined threshold.

29. A method comprising:
(a) receiving, by a first filter, a windshear measurement; and
(b) providing, by the first filter, a filtered windshear measurement based on the windshear measurement;
(c) receiving, by a second filter, a modified windshear measurement; and
(d) providing, by the second filter, a filtered modified windshear measurement based on the modified windshear measurement; and
(e) providing a windshear alert based on the filtered windshear measurement and the filtered modified windshear measurement,
wherein the windshear measurement corresponds to a horizontal shear measurement and a vertical shear measurement, wherein the filtered windshear measurement corresponds to a filtered horizontal shear measurement and a filtered vertical shear measurement, the method further comprising:
(a) detecting, based on the filtered horizontal shear measurement and the filtered modified horizontal shear measurement, a presence of at least one of a headwind shear and a tailwind shear; and
(b) detecting, based on the filtered vertical shear measurement and the filtered modified vertical shear measurement, a presence of at least one of an updraft shear and a downdraft shear.

30. The method of claim 29, wherein:
the first filter provides the filtered windshear measurement based further on a first natural frequency and a first damping ratio; and
the second filter provides the filtered modified windshear measurement based further on a second natural frequency and a second damping ratio.

31. The method of claim 29, wherein the modified windshear measurement is a rectification of the windshear measurement.

32. The method of claim 31, wherein modified windshear measurement is a half-wave rectification of the windshear measurement.

33. The method of claim 29, wherein the windshear alert comprises a windshear warning when at least one of the tailwind shear and the downdraft is present, and wherein the windshear alert comprises a windshear caution when at least one of the headwind shear and updraft is present.

34. The method of claim 29, wherein at least one of the first filter and the second filter comprises an order greater than one.

35. The method of claim 34, wherein at least one of the first filter and the second filter comprises a second order filter.

36. The method of claim 29, wherein at least one of the first filter and the second filter comprises at least one of a digital filter, a passive analog filter, and an active analog filter.

37. The method of claim 29, wherein the windshear alert is further based upon the windshear measurement, a maximum allowable speed loss, and an elapsed time the windshear measurement exceeds a predetermined threshold.

* * * * *